UNITED STATES PATENT OFFICE 2,094,479

TREATMENT OF WELLS

James G. Vandergrift, Spencer, W. Va., assignor to William E. Snee, West Elizabeth, Pa.

No Drawing. Application December 30, 1936, Serial No. 118,326

12 Claims. (Cl. 166—21)

This invention relates to the treatment of wells, such as oil, gas, brine or water wells. More particularly, it relates to the treatment of wells in which the fluid mineral bearing structure comprises sandstone or shale, or other silica bearing material, or is contiguous to such a formation.

One of the objects of my invention is to change the natural conditions existing in fluid mineral bearing formations, which in the natural state tend to retard the flow of fluid mineral products through such formations toward well holes drilled therein. Accordingly, by my invention I provide a method whereby the yield of mineral fluid from the well, such as oil, gas, brine or water, is increased and its recovery from the geological formation greatly facilitated. This is obtained by increasing the porosity and permeability of the producing formation, or of strata contiguous to the producing formation. Also in carrying out my invention pore-clogging materials, such as colloidal muds, sediments, paraffin, etc., are removed from the face or body of the producing formation.

Heretofore various methods have been proposed for opening up or cleaning up a clogged well hole, such as drilling, "shooting" with explosives, or by chemical treatment. The first two methods have the disadvantage that the pump rod and tube must be removed prior to applying the treatment, in addition to which, when an explosive is used, there is danger of damaging the well casing or sealing off the producing stratum. The chemical methods heretofore proposed, such as treatment with hydrochloric acid solutions, have been capable of successful use for increasing the output of wells only in limestone formations. It has been thought impossible to increase, by chemical treatment, the output of wells in which the producing formation consists largely of sandstone, shale, or other siliceous rock. By my invention, however, I am enabled to accomplish this purpose.

The invention also provides an improved method for straightening crooked well holes or for correcting flat or tight holes, where the well is located in a siliceous formation.

The invention further provides a method of freeing drilling tools which have become imprisoned in a siliceous stratum through which a well is being drilled.

By my invention I also provide an improved method for facilitating the injection of oil, gas, water or other fluid, into wells for repressuring, flooding or leaching, where the wells are located in a sandstone or shale formation.

The invention may also be applied advantageously for the treatment of wells in dense limestone or dolomitic formations, which, on account of their physical character, are but slowly attacked by treatment with hydrochloric acid according to usual methods.

The improved method which constitutes my invention consists essentially in introducing into the geological formation at the base of the well a fluid reagent comprising a mixture of acids containing hydrofluoric acid. The fluid reagent which I preferably employ comprises a mixture of hydrofluoric acid and a mineral acid, such as sulphuric, nitric or hydrochloric. Such mixed acid solution is capable of attacking the siliceous or calcareous rock in the producing formation and increasing its porosity and permeability, whereby the flow of mineral fluid from the well may be increased when the well is put back into production.

The reagent may be prepared by simply mixing solutions of hydrofluoric acid and of the mineral acid. It may also be prepared by adding a fluoride or a solution of a fluoride to a stoichiometrical excess of the mineral acid solution so that the fluoride is converted to hydrofluoric acid by reaction with the mineral acid, thereby forming a mixture of hydrofluoric acid and the excess of mineral acid. Suitable fluorides for the purpose are ammonium bifluoride, sodium fluoride, or other metallic fluoride readily soluble in mineral acid. To the mixed acid solution prepared in either of the ways mentioned a corrosion inhibitor may be added to prevent attack of the acid upon metallic parts of the well.

In general I prefer to employ mixed solutions of hydrofluoric acid and hydrochloric acid. The proportions of the two acids may be widely varied. For example, I have obtained successful results in treating wells in a sandstone formation with a mixed acid composed of equal volumes of 60 per cent hydrofluoric acid and of 30 per cent hydrochloric acid. In other cases it has been found more advantageous to employ a larger proportion of hydrochloric acid than of the hydrofluoric acid. For example, a hydrochloric acid solution of from about 10 to 20 per cent strength containing from ½ to 10 per cent by weight of hydrofluoric acid or equivalent fluoride has been found to give good results in treating dense calcareous formations.

It has heretofore been proposed to use hydrofluoric acid alone in the treatment of wells located in sandstone formations, but such procedure is not practical for the reason that when hydrofluoric acid acts upon siliceous material in the presence of water gelatinous silica is precipitated, which, if such precipitation occurred within the pores of the formation in a well, would tend to stop them up instead of opening them, thereby defeating the purpose of the treatment. By employing a mixed acid solution consisting of hydrofluoric acid and a mineral acid, however, the presence of the mineral acid prevents the precipitation of gelatinous silica. Mixtures of hydrofluoric acid and hydrochloric acid are particularly suitable for treating formations containing substantial amounts of lime, in which case the hydrofluoric acid is capable of acting on siliceous constituents of the rock, while the hydrochloric acid acts upon the calcareous constituents, thereby forming soluble salts, as well as preventing the precipitation of insoluble compounds.

In carrying out my invention it is desirable to provide means for ensuring sufficient penetration or impregnation of the rock formation by means of the mixed acid reagent. Accordingly, the well may be subjected to pressure after the reagent has been injected thereinto. This may be accomplished by pumping air or gas into the well or by providing a hydrostatic head of a neutral liquid, such as oil. According to a different procedure the well may be put under vacuum prior to injecting the acid reagent, when the acid is introduced and subsequently, if desired, pressure may be applied, in addition, to force the reagent into the formation.

After the mixed acid reagent has had sufficient time to act upon the formation, the spent acid may be removed by pumping or bailing out. It may sometimes be desirable to flush out the well with water or other neutral liquid after the spent acid has been removed and before the well is put back into production.

The treatment of the geological formation in a well, from which fluid mineral products are produced, by means of the method of my invention, using a mixed acid solution containing hydrofluoric acid and a mineral acid, results in a disintegration of the formation and an increase in the pore space and permeability of the stratum. This in turn decreases the resistance along the oil and gas channels with a proportionate increase of the flow of mineral products to the well when the latter is put back into production.

In case it is desired to employ the herein described mixed acid reagent in conjunction with a flooding or repressuring treatment in an oil field, for example, the porosity of the producing formation may be increased by first injecting into the formation through one or more wells a solution of hydrofluoric acid and a mineral acid and permitting it to act upon the formation to open up the pores and channels therein. Thereupon the flooding or pressuring fluid may be introduced in accordance with the usual practice.

While I have described certain preferred embodiments of the method of my invention, it will be understood that I do not intend to be limited thereby, but that the invention may be otherwise embodied or practiced within the scope of the appended claims.

This application is a continuation in part of my prior application, Serial No. 661,089, filed March 16, 1933.

I claim:

1. In the treatment of a well to increase the rate of fluid production therefrom, the step which comprises applying a reagent comprising a mixture of a mineral acid and hydrofluoric acid to the geological formation at the base of the well.

2. In the treatment of a well to increase the rate of fluid production therefrom, the step which comprises applying a reagent comprising hydrochloric acid and hydrofluoric acid to the geological formation at the base of the well.

3. In the treatment of a well to increase the rate of fluid production therefrom, the step which comprises applying a reagent comprising hydrochloric acid, hydrofluoric acid and an inhibitor to the geological formation at the base of the well.

4. The method of increasing the flow of fluid mineral products from a well which comprises introducing into the well a chemical reagent comprising hydrofluoric acid and a mineral acid and permitting it to act upon the formations adjacent to the well cavity.

5. The method of increasing the flow of fluid mineral products from a well which comprises introducing into the well a chemical reagent comprising hydrofluoric acid and hydrochloric acid and permitting it to act upon the formations adjacent to the well cavity.

6. The method of increasing the porosity and permeability of geological formations producing fluid mineral products which comprises introducing into the formation a reagent comprising hydrofluoric acid and a mineral acid and applying pressure to the reagent to force it into the formation.

7. The method of increasing the output of an oil or gas well which comprises introducing into the well a solution containing hydrofluoric acid and a mineral acid, permitting the acid to act upon the formations adjacent to the well cavity, while applying pressure upon the solution and withdrawing the spent acid.

8. The method of increasing the output of an oil or gas well which comprises introducing into the well a solution containing hydrofluoric acid and hydrochloric acid, permitting the acid to act upon the formations adjacent to the well cavity, while applying pressure upon the solution, and withdrawing the spent acid.

9. In the method of repressuring or flooding an oil-producing formation, the steps which consist in introducing into the formation a fluid reagent comprising hydrofluoric acid and a mineral acid, permitting the reagent to act upon the formation, and then introducing a flooding or pressuring fluid.

10. In the treatment of a well to increase the rate of fluid production therefrom, the step which comprises injecting into the geological formations adjacent the well cavity a reagent comprising a major proportion of hydrochloric acid and a minor proportion of hydrofluoric acid.

11. The method of increasing the flow of fluid mineral products from a well in silica bearing formations, which comprises introducing hydrofluoric acid and a mineral acid into the well cavity, permitting the hydrofluoric acid to act upon the formations surrounding the well cavity, and removing at least a portion of the reaction products.

12. In a method of treating wells, the steps which consist in adding a fluoride to a stoichiometrical excess of hydrochloric acid to form a reagent composed of a mixture of hydrochloric acid and hydrofluoric acid and applying such reagent to the geological formation surrounding the well cavity.

JAMES G. VANDERGRIFT.